(12) United States Patent
Nakata (10) Patent No.: US 10,200,630 B2
(45) Date of Patent: Feb. 5, 2019

(54) IMAGE CAPTURING APPARATUS CAPABLE OF CHANGING AN APERTURE VALUE BASED ON A CHANGE IN AN APERTURE DIAMETER, CONTROLLING METHOD OF THE SAME, AND RECORDING MEDIUM

(71) Applicant: CANON KABUSHIKI KAISHA, Tokyo (JP)

(72) Inventor: Takamichi Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/658,083

(22) Filed: Jul. 24, 2017

(65) Prior Publication Data

US 2018/0035034 A1 Feb. 1, 2018

(30) Foreign Application Priority Data

Jul. 28, 2016 (JP) .................................. 2016-148939

(51) Int. Cl.
*H04N 5/238* (2006.01)
*H04N 5/235* (2006.01)

(52) U.S. Cl.
CPC ........... *H04N 5/238* (2013.01); *H04N 5/2351* (2013.01)

(58) Field of Classification Search
CPC ............................. H04N 5/238; H04N 5/2351
See application file for complete search history.

(56) References Cited

U.S. PATENT DOCUMENTS

| 2011/0050923 A1* | 3/2011 | Nomura | G03B 7/097 348/208.99 |
| 2012/0229654 A1* | 9/2012 | Solomon | H04N 5/2251 348/207.1 |

FOREIGN PATENT DOCUMENTS

JP 2012-095116 A 5/2012

\* cited by examiner

*Primary Examiner* — Nelson D. Hernández Hernández
(74) *Attorney, Agent, or Firm* — Canon U.S.A., Inc. IP Division (57) ABSTRACT

Image capturing apparatuses having an exposure control unit configured to execute exposure control by changing at least one of parameters of an aperture value, an accumulation period of a charge in an image sensor, and an amplification amount of a signal output by the image sensor; and a generation unit configured to generate aperture control information related to a change in the aperture value in the exposure control are included. In a case where an aperture value is changed in accordance with a luminance change of an object, the generation unit generates the aperture control information with which, with respect to a specific aperture value which is settable, an actual aperture value discretely changes. In the case where an aperture value is changed in accordance with the luminance change of the object, on the basis of the aperture control information, the exposure control unit discretely changes the aperture value.

15 Claims, 9 Drawing Sheets

HIGH PRIORITY ←――――――――――――――→ LOW PRIORITY

| | UPPER LIMIT VALUE/ LOWER LIMIT VALUE OF APERTURE VALUE | PRESENCE/ABSENCE OF ZOOM LENS | NUMBER OF DRIVING TIMES OF APERTURE | MTF CHARACTERISTICS OF LENS |
|---|---|---|---|---|
| APERTURE TARGET VALUE | – | VALUE WHICH CAUSES LESS CHANGE ACCORDING TO ZOOMING OPERATION | – | PRIORITY IS PUT ON APERTURE VALUE WHICH ENABLES HIGH RESOLUTION |
| APERTURE CHANGING STAGE NUMBER | – | VALUE WHICH CAUSES LESS OPERATION OF APERTURE ACCORDING TO ZOOMING OPERATION | STAGE DIFFERENCE BECOMES GREATER AS NUMBER OF DRIVING TIMES IS LARGER | – |
| SETTABLE APERTURE VALUE | UPPER LIMIT VALUE/ LOWER LIMIT VALUE OF APERTURE VALUE WHICH IS SETTABLE BY LENS UNIT ARE NOT EXCEEDED | – | BE FEWER AS NUMBER OF DRIVING TIMES IS LARGER | PRIORITY IS PUT ON APERTURE VALUE WHICH ENABLES HIGH RESOLUTION |

HIGH PRIORITY ──────────────────────────────────────────► LOW PRIORITY

| | PROPER EXPOSURE RANGE | LUMINANCE INFORMATION | COLOR INFORMATION | SPECIFIC OBJECT COUNT |
|---|---|---|---|---|
| APERTURE TARGET VALUE | DETERMINE PROPER EXPOSURE RANGE FROM ACCUMULATION PERIOD AND AMPLIFICATION FACTOR, AND DETERMINE APERTURE TARGET VALUE WHICH CAUSES LOW FREQUENCY OF CHANGING | DETERMINE APERTURE TARGET VALUE FROM CURRENT LUMINANCE INFORMATION | - | - |
| APERTURE CHANGING STAGE NUMBER | - | - | • STAGE NUMBER IS SMALL IN INSIDE OF BUILDING<br>• STAGE NUMBER IS LARGE IN OUTSIDE OF BUILDING | STAGE NUMBER IS LARGER AS NUMBER OF COUNTED PERSONS IS LARGER |
| SETTABLE APERTURE VALUE | - | - | PRIORITY IS PUT ON APERTURE VALUE ON OPENING SIDE IN INSIDE OF BUILDING | - |

IMAGE CAPTURING APPARATUS CAPABLE OF CHANGING AN APERTURE VALUE BASED ON A CHANGE IN AN APERTURE DIAMETER, CONTROLLING METHOD OF THE SAME, AND RECORDING MEDIUM

BACKGROUND OF THE INVENTION

Field of the Invention

The present disclosure relates to one or more embodiments of each of an image capturing apparatus capable of controlling an aperture, a controlling method of the same, and a recording medium.

Description of the Related Art

Conventionally, as exposure control at a time of capturing an image of an object to acquire image data, a method in which a plurality of exposure parameters are changed in combination to thereby set predetermined exposure (exposure amount) has been known.

In order to change an aperture value, among the exposure parameters, it is necessary to change an aperture diameter of an aperture that is mechanical constitution, so that it is desired that frequency of changing the aperture value is suppressed as much as possible for suppressing reduction in durability of the aperture.

Japanese Patent Laid-Open No. 2012-095116 proposes a technique that an aperture value is set on the basis of a luminance value of an object before a start of recording a moving image, and, after the start of recording the moving image, a charge accumulation period and photographing sensitivity are preferentially changed.

SUMMARY OF THE INVENTION

The present disclosure provides at least one embodiment of an image capturing apparatus capable of changing an aperture value related to a change in an aperture diameter of an aperture, including: an image sensor; an exposure control unit configured to execute exposure control by changing at least one of parameters of an aperture value, an accumulation period of a charge in the image sensor, and an amplification amount of a signal output by the image sensor; and a generation unit configured to generate aperture control information related to the change in the aperture value in the exposure control. In a case where the exposure control is executed by changing an aperture value in accordance with a luminance change of an object, the generation unit generates the aperture control information so that, with respect to a specific aperture value that is settable, an actual aperture value discretely changes. In the case where the exposure control is executed by changing an aperture value in accordance with the luminance change of the object, on a basis of the aperture control information generated by the generation unit, the exposure control unit discretely changes the aperture value with respect to the specific aperture value that is settable.

According to other aspects of the present disclosure, one or more additional image capturing apparatuses, one or more methods for controlling same, and one or more storage or recording mediums for use therewith are discussed herein. Further features of the present disclosure will become apparent from the following description of exemplary embodiments with reference to the attached drawings.

DESCRIPTION OF THE EMBODIMENTS

Hereinafter, embodiments of the disclosure will be described in detail on the basis of accompanying drawings.

(First Embodiment)

(Basic Configuration of Monitoring Camera 1)

Figure 1:
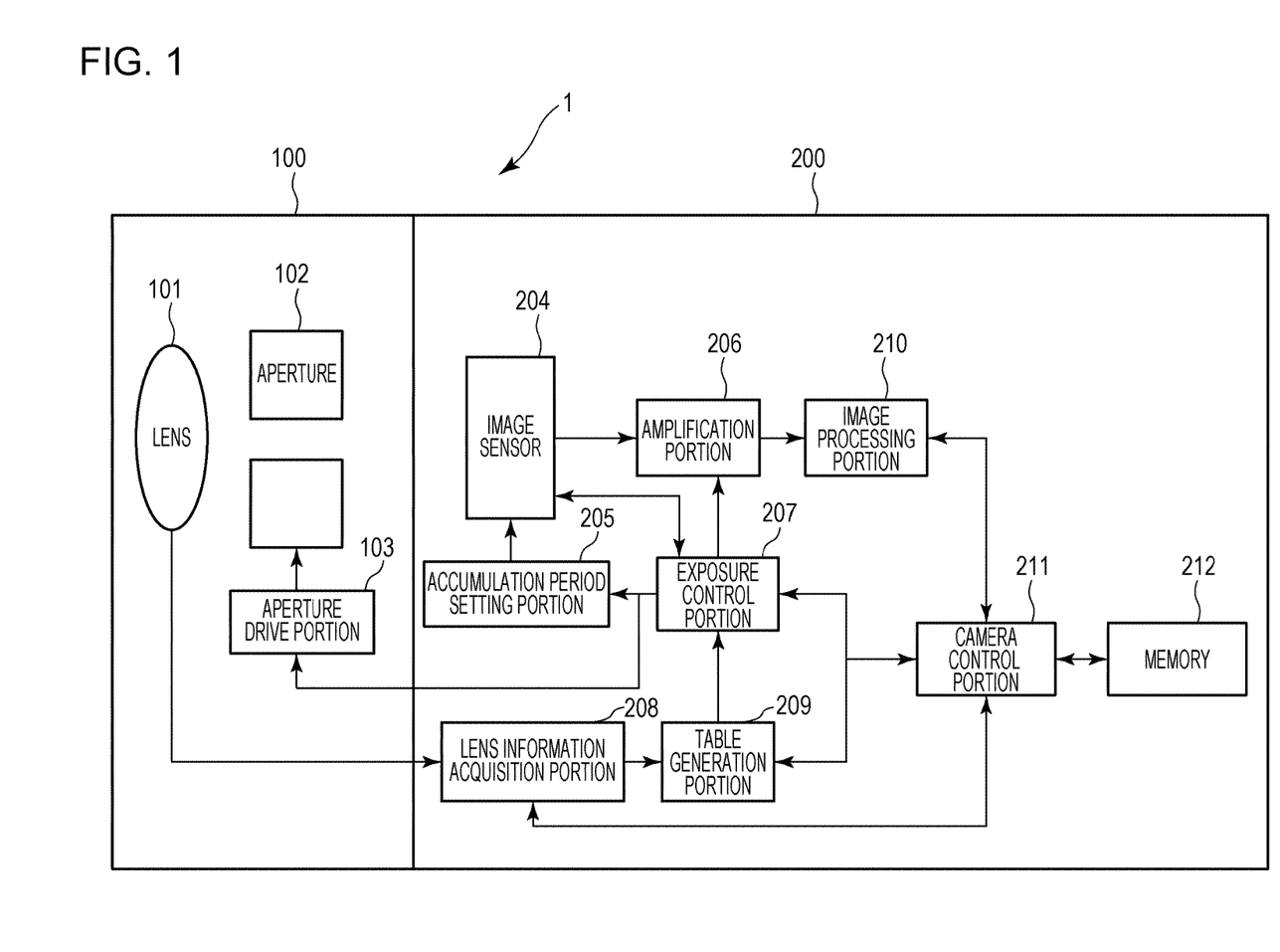
FIG. 1 is a block diagram illustrating an example of a basic configuration of a monitoring camera that is an image capturing apparatus according to at least a first embodiment of the disclosure.

A basic configuration of a monitoring camera (hereinafter, simply referred to as a camera) 1 that is an image capturing apparatus according to an embodiment of the disclosure will be described below with reference to FIG. 1. FIG. 1 is a block diagram illustrating an example of the basic configuration of the camera 1 that is an image capturing apparatus according to at least a first embodiment of the disclosure. The camera 1 of the present embodiment has a camera main body 200 that includes an image sensor 204 and the like inside thereof and a lens unit 100 that is attachable to the camera main body 200. FIG. 1 illustrates the camera 1 in a state where the lens unit 100 is attached to the camera main body 200.

An object image which is not illustrated passes through an aperture 102 via a lens 101, and enters the image sensor 204 which is a solid-state image sensor of a charge accumulation type such as a CCD or a CMOS sensor. Note that, although the lens 101 is illustrated as one lens in FIG. 1, the lens 101 of the present embodiment is provided with a plurality of lenses such as a lens for a zooming operation, a lens for a shifting operation, and a lens for a focusing operation. Moreover, the lens unit 100 has an aperture drive portion 103 by which the aperture 102 is driven.

An accumulation period setting portion 205 is an accumulation period setting unit configured to control (set) an accumulation period of a charge in the image sensor 204. Note that, the accumulation period setting portion 205 controls accumulation starting timing of a charge (timing of readout or reset of an accumulated charge) in the image sensor 204, but there is no limitation thereto. For example, in a case where a so-called mechanical shutter (not illustrated) is included, a configuration in which an accumulation period is set by controlling an opening/closing operation of the mechanical shutter may be provided.

An amplification portion 206 is an amplification unit configured to amplify an image signal (output signal) output from the image sensor 204 by a predetermined amplification amount (amplification factor). Note that, the amplification portion 206 is able to set an amplification amount for both of an analog image signal before being subjected to conversion by an A/D converter (not illustrated) and a digital image signal after the conversion.

An exposure control portion 207 is an exposure control unit configured to control each portion of the camera 1 on the basis of a luminance signal (object luminance) obtained by calculation based on the acquired image signal (image data) and to thereby control exposure related to acquisition of the image signal. As a calculating method of the luminance signal, any known method may be adopted.

In the present embodiment, by changing at least one of an aperture value, an accumulation period, and an amplification amount as a parameter related to exposure control, it is possible to change (control) exposure. Note that, for exposure in the present embodiment, it is set that a change of brightness of 1 Ev obtained by conversion into APEX unit is a change of one stage of exposure, for example.

A lens information acquisition portion 208 is an information acquisition unit configured to acquire lens information related to the lens unit 100 from a side of the lens unit 100. Note that, in a case where the lens unit 100 is detachable with respect to the camera main body 200, the lens information is transmitted to a side of the camera main body 200 from the side of the lens unit 100 via a mount contact (not illustrated) provided in each of the lens unit 100 and the camera main body 200. Moreover, the lens information is stored in advance in a lens memory (not illustrated) which is provided inside the lens unit 100.

The above-described lens information includes an identification value of the lens unit 100, an upper limit value and a lower limit value of an aperture value, a focal length, a change amount of temperature of the lens 101, an MTF curve of each zoom position, the number of driving times of the aperture 102, and the like. Note that, the above-described identification value is a value specific to the lens unit 100, and a value with which the lens unit 100 attached to the camera main body 200 is identified. The upper limit value and the lower limit value of an aperture value are an upper limit value and a lower limit value of an aperture value (f-number) related to an aperture diameter of the aperture 102 which is settable. The change amount of temperature of the lens 101 is a shift amount of a shift lens (not illustrated) of the lens 101 due to a change in temperature. The number of driving times of the aperture 102 is the number of driving times of the aperture 102 in a predetermined period (for example, until the present).

A table generation portion 209 is a table data generation unit configured to generate table data which is referred to when the above-described exposure control is executed on the basis of the information acquired by the lens information acquisition portion 208. In the present embodiment, aperture table data that is aperture control information to be used when exposure control is executed by changing an aperture value will be particularly described. Details of the aperture table data (aperture control information) will be described below.

The table data generated by the table generation portion 209 is input to the exposure control portion 207, and the exposure control portion 207 executes control (automatic exposure control) by which exposure is automatically changed on the basis of the table data.

An image processing portion 210 is an image processing unit configured to perform various types of development processing such as predetermined image interpolation, resizing processing including reduction, color conversion processing, calculation of the number of pieces of pixel data of a saturated pixel, an underexposure pixel, or the like, and white balance adjustment with respect to the image signal output from the amplification portion 206. The image signal for which various types of processing have been executed by the image processing portion 210 is converted into an appropriate format for a recording medium and display by a converter (not illustrated) to be recorded and displayed.

A camera control portion 211 is a camera control unit configured to generally control the respective portions of the camera 1, and includes a microcomputer for a camera (camera CPU) which is not illustrated. For example, the camera control portion 211 controls an operation of each portion of the camera 1 by giving an instruction to the exposure control portion 207, the lens information acquisition portion 208, the table generation portion 209, the image processing portion 210, or the like. A memory 212 is a recording medium capable of recording data related to an operation of the camera 1 and various data acquired by using the camera 1. The memory 212 of the present embodiment includes a ROM region as a nonvolatile memory and a RAM region as a volatile memory. The above is the basic configuration of the camera 1 of the present embodiment.

(Image Capturing Processing)

Figure 2:
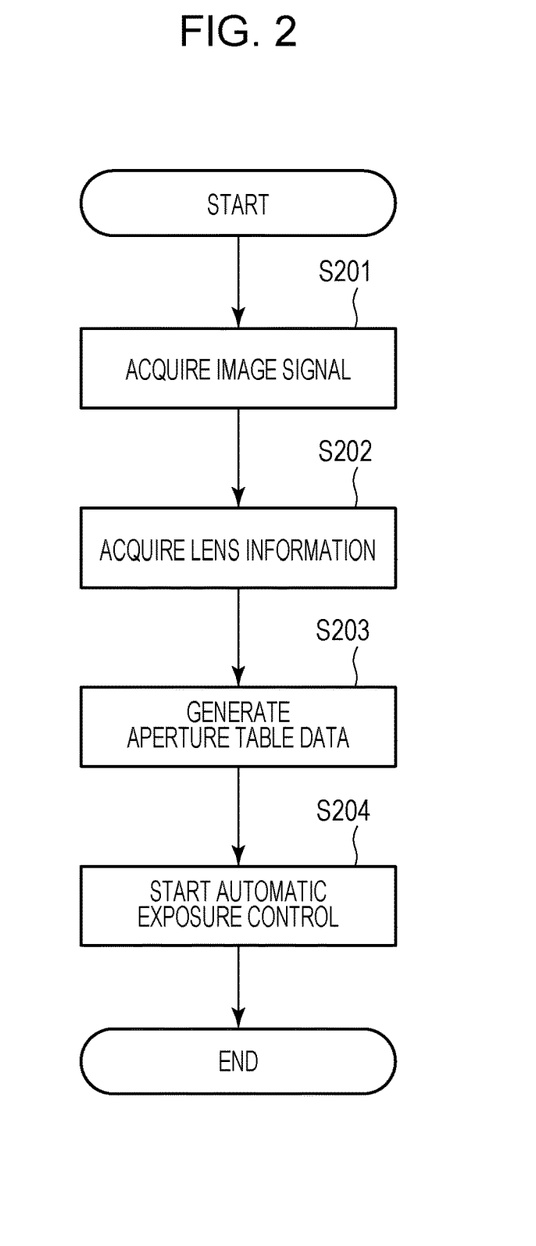
FIG. 2 is a flowchart for explaining image capturing processing according to at least the first embodiment of the disclosure.

Hereinafter, image capturing processing according to the camera 1 of the present embodiment will be described with reference to FIG. 2. FIG. 2 is a flowchart for explaining the image capturing processing according to at least the first embodiment of the disclosure. When the image capturing processing is started in response to an operation on a release button (not illustrated) by a user, the camera control portion 211 captures an image of an object by using the image sensor 204 and acquires an image signal at step S201.

Next, the camera control portion 211 acquires lens information from the lens unit 100 via the lens information acquisition portion 208 at step S202. Then, at step S203, the table generation portion 209 generates table data related to exposure control on the basis of the lens information which has been acquired. Note that, in the present embodiment, aperture table data which is concerned with a change in an aperture value of the aperture 102 is generated. This will be described in detail in explanation of a generating method of the aperture table data.

Next, the camera control portion 211 controls an operation of each portion of the camera 1 on the basis of a result of a photometric operation based on the image signal which has been generated and the aperture table data, and thereby executes exposure control at step S204. Specifically, the camera control portion 211 generates (or selects) a program diagram that satisfies various conditions set on the basis of the aperture table data, and executes the exposure control on the basis of the program diagram. Note that, in the present embodiment, in order to reduce frequency of changing an aperture value, a program diagram that is able to preferentially change an accumulation period and the above-described amplification amount is generated. The above is the image capturing processing according to the camera 1 of the present embodiment.

Note that, although the configuration in which the image capturing processing is started in response to the operation on the release button has been described in the present embodiment, a configuration in which the above-described image capturing processing is executed in response to ON of power supply of the camera 1 may be provided, for example.

(Generating Method of Aperture Table Data)

Figure 3A:
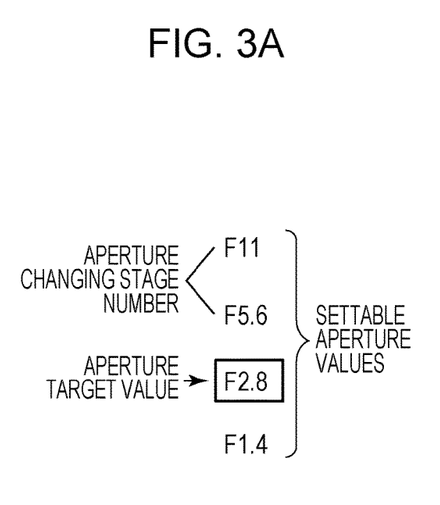
FIGS. 3A and 3B are views for exemplifying aperture table data according to at least the first embodiment of the disclosure.
Figure 3B:
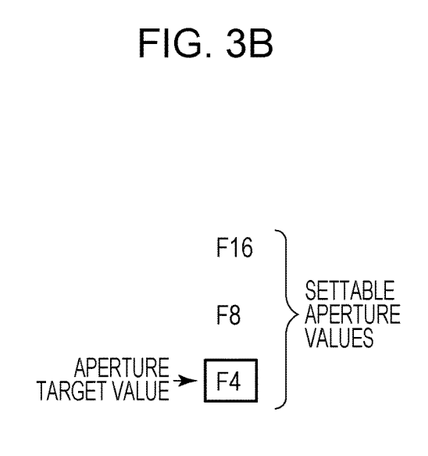

Next, the generating method of the aperture table data according to the camera 1 of the present embodiment will be described. FIGS. 3A and 3B are views for exemplifying the aperture table data according to at least the first embodiment of the disclosure, and each of FIGS. 3A and 3B illustrates mutually different data. As illustrated in FIGS. 3A and 3B, the table data in FIG. 3A and the table data in FIG. 3B are different in an aperture value which is settable (settable aperture value) and a pitch width of the aperture value (aperture changing stage number) with which continuous change is allowed. When executing exposure control by changing an aperture value, the table generation portion 209 determines a target value of the aperture value (aperture target value), which serves as a target at a time of starting the exposure control, and generates a settable aperture value including the aperture target value and the aperture changing stage number on the basis of the above-described lens information. That is, in the present embodiment, the aperture target value, the settable aperture value, and the aperture changing stage number are information that constitutes the above-described aperture table data.

Note that, the above-described aperture changing stage number corresponds to a difference between continuous values among settable aperture values in one piece of aperture table data. Accordingly, for example, an aperture changing stage number of a case where continuous settable aperture values in predetermined aperture table data are f/1.4 and f/5.6 is two stages (2 Ev) of an aperture value converted into APEX unit.

In an example illustrated in FIG. 3A, an aperture target value based on an image signal is f/2.8, settable aperture values are f/1.4, f/2.8, f/5.6, and f/11, and an aperture changing stage number is 2 Ev (two stages). In an example illustrated in FIG. 3B, an aperture target value based on an image signal is f/4, settable aperture values are f/4, f/8, and f/16, and an aperture changing stage number is 2 Ev (two stages).

As described above, an aperture target value, a settable aperture value, and aperture changing stage number are made different for each table data for suppressing frequency of changing an aperture value as much as possible. As described above, the aperture 102 is a member that, by changing the aperture diameter, adjusts an amount of light which enters a side of the image sensor 204, and a mechanical configuration for changing the aperture diameter is adopted therefor. Thus, when the frequency of changing an aperture value is high, durability of the aperture 102 is reduced due to wear of the aperture 102 and the like. Particularly in an image capturing apparatus such as a monitoring camera, which is required to continuously record a video for a comparatively long time, when a life of mechanism thereof is shortened due to the reduction in the durability, frequency of replacing an aperture or a lens unit becomes higher, so that an influence on steady observation of an object is great. Accordingly, in order to suppress the reduction in the durability of the aperture, it is desired that the frequency of changing an aperture value (aperture diameter of the aperture) is suppressed as much as possible.

Here, an aperture value with which the frequency of the change is reduced varies in accordance with information related to a lens unit, a photographing scene, and various types of information such as durability of an aperture. For example, in a case where the lens unit is a zoom lens, an aperture value which is settable regardless of a zooming operation (at any zoom position) allows reducing the frequency of changing an aperture value. Then, in the present embodiment, the above-described issue is dealt with by setting most suitable aperture table data based on the lens information of the lens unit 100.

Figure 4:
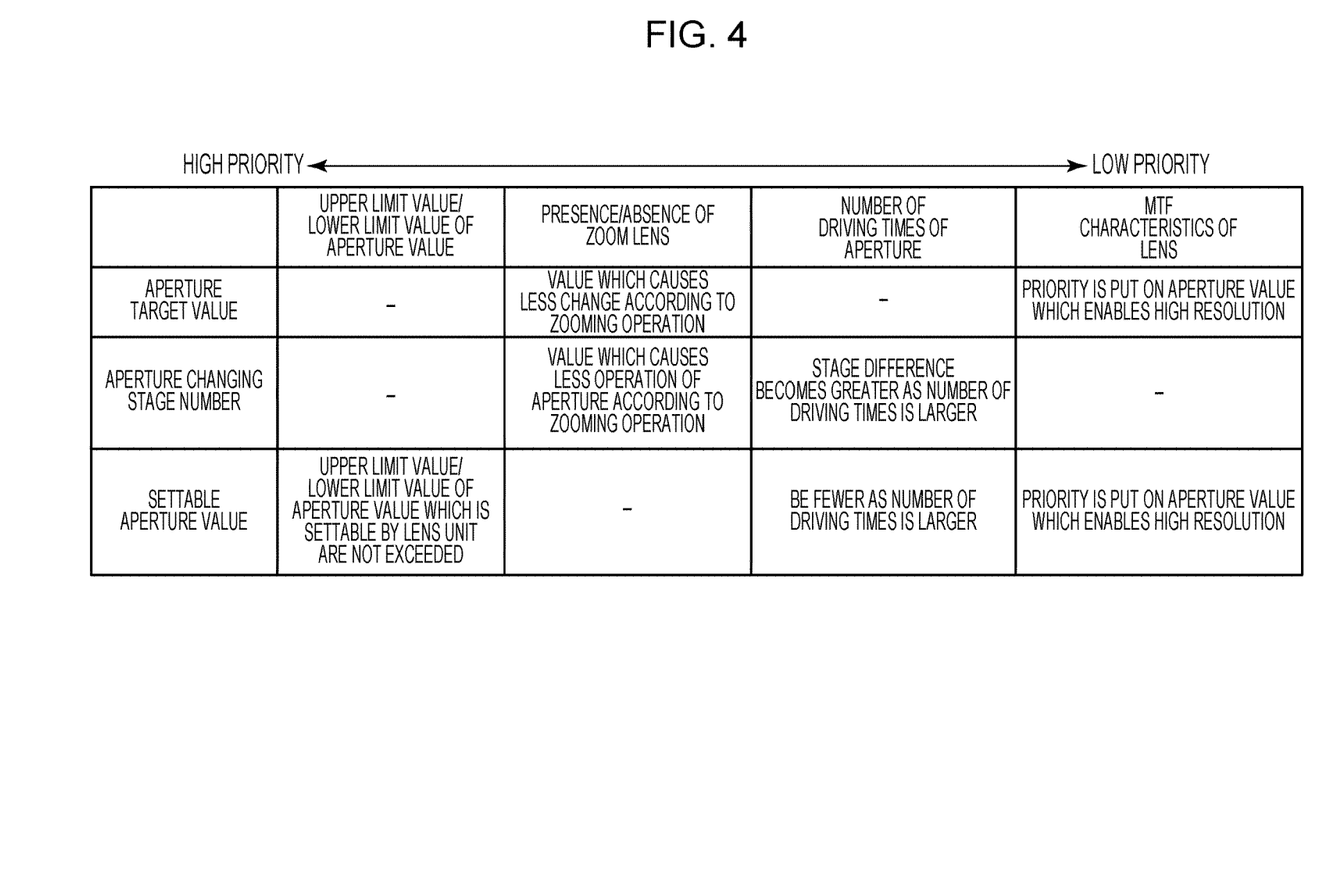
FIG. 4 is a table for exemplifying a setting method of the aperture table data according to at least the first embodiment of the disclosure.

FIG. 4 is a table for exemplifying a setting method of the aperture table data according to at least the first embodiment of the disclosure. Each column of FIG. 4 indicates information obtained from the lens information, and each row indicates information that constitutes the aperture table data. Note that, whether or not to be a zoom lens is judged by the camera control portion 211 on the basis of the information related to the lens identification value and (or) the focal length. In the figure, information in a column which is closer to the left side is information which is more preferentially referred to when setting the aperture table data.

As illustrated in FIG. 4, an aperture target value is set on the basis of information related to whether or not the lens unit 100 is a zoom lens and information related to Modulation Transfer Function (MTF) characteristics of a lens, for example. Note that, the MTF characteristics in a case where the lens unit 100 is a zoom lens include information related to a change in characteristics according to respective zoom positions (photographing magnification).

In the present embodiment, the information related to whether or not to be a zoom lens is information having priority of being referred to when setting the aperture target value over the information related to the MTF characteristics. For example, in a case where the lens unit 100 is a zoom lens, it is desired that the number of times of changing an aperture value in accordance with a zooming operation is reduced. Particularly in a general zoom lens, a restriction value (maximum aperture value) of an aperture on an opening side varies in accordance with zoom positions (whether a wide-angle side or a telephoto side), so that, in a case where an aperture value which causes an aperture diameter of the aperture to be in a vicinity of the opening side is set, it is necessary to change the aperture value in accordance with a zooming operation. Accordingly, as the aperture target value, candidates of an aperture value which causes less change according to a zooming operation are selected. Thereafter, on the basis of the MTF characteristics of the lens, an aperture value which enables high resolution is selected from the candidates which have been selected, and thereby the aperture target value is set.

Similarly, a value is set for each of the settable aperture value and the aperture changing stage number on the basis of priority based on the lens information which has been acquired. With the operation above, the aperture table data is generated. Note that, although an example in which the aperture table data is generated on the basis of four pieces of information in total has been described in FIG. 4, a configuration in which the aperture table data is generated on the basis of information other than them may be provided.

Figure 5A:
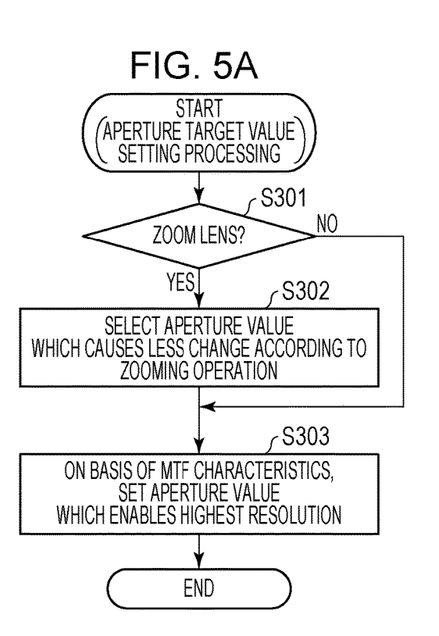
FIGS. 5A, 5B, and 5C are flowcharts illustrating the setting method of the aperture table data according to at least the first embodiment of the disclosure.
Figure 5B:
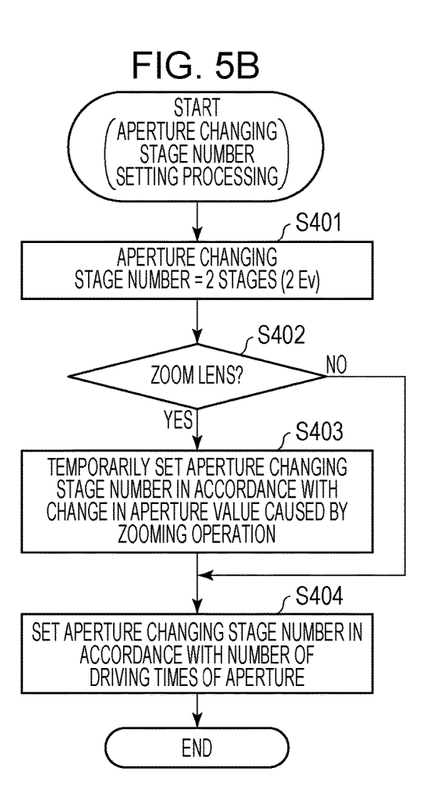
Figure 5C:
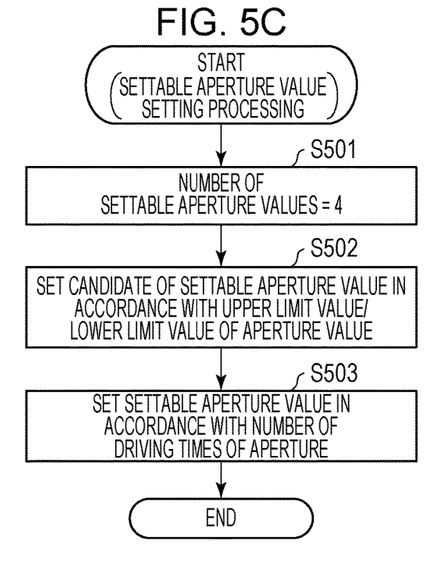

The generating method of the aperture table data, which is described above, will be described in detail with reference to FIGS. 5A to 5C. FIGS. 5A to 5C are flowcharts illustrating the setting method of the aperture table data according to at least the first embodiment of the disclosure. FIG. 5A is a flowchart illustrating a setting method of an aperture target value, FIG. 5B is a flowchart illustrating a setting method of an aperture changing stage number, and FIG. 5C is a flowchart illustrating a setting method of a settable aperture value. Note that, in an example illustrated in FIGS. 5A to 5C, it is assumed that the lens unit 100 is a zoom lens, the maximum aperture value (open f-number) of the wide-angle side is f/2.8, that of the telephoto side is f/4, and lens-specific settable aperture values are f/2.8 to f/22 at a pitch of one stage.

First, the setting method of the aperture target value will be described. As illustrated in FIG. 5A, at step S301, the table generation portion 209 judges whether or not the lens unit 100 is a zoom lens, on the basis of the lens information which has been acquired. In a case where a result of the judgment is YES, the procedure moves to step S302, and, in a case of NO, the procedure moves to step S303.

Next, the table generation portion 209 selects an aperture value, which causes less change in the aperture value when a zooming operation is executed as a candidate of the aperture target value at step S302. In the present embodiment, in order to deal with a change in a maximum aperture value according to a zooming operation, aperture values of f/4 to f/22 are selected as candidates of the aperture target value. That is, compared with a case where the lens unit 100 is not a zoom lens (but a single focal lens or the like), in a case where the lens unit 100 is a zoom lens, an aperture value which is actually settable is restricted so as to be closer to a closing side.

Then, at step S303, among the candidates selected at step S302, the table generation portion 209 sets, as the aperture target value, an aperture value which enables highest resolution in the MTF characteristics based on the lens information which has been acquired, and ends the processing (aperture target value setting processing). Note that, in a case where the lens unit 100 as above is used, f/4 which enables the highest resolution among the aperture values of f/4 to f/22 is set as the aperture target value. In a case where, at step S301, it is judged that the lens unit 100 is not a zoom lens, an aperture value which enables the highest resolution is set as the aperture target value simply on the basis of the MTF characteristics.

Next, the setting method of the aperture changing stage number will be described. As illustrated in FIG. 5B, in a case where this is the first processing, at step S401, the table generation portion 209 sets the aperture changing stage number to be two stages (2 Ev) of exposure which is obtained by conversion into the APEX unit. Note that, the aperture changing stage number which is to be set after starting the processing may be any stage number as long as being equal to or more than two stages. That is, in the present embodiment, with respect to specific aperture values which are settable by the lens unit 100, an exposure difference between continuous settable aperture values (between aperture values) is at least two stages. In other words, in a case where exposure control is executed by changing the aperture diameter of the aperture 102, an actual aperture value changes discretely with respect to the specific aperture values which are settable by the lens unit 100.

Note that, in the present embodiment, the lens unit 100 is able to change an aperture value with resolution corresponding to one stage of exposure, so that a configuration in which the exposure difference between aperture values which are settable at a time of changing the aperture value is set to be at least two stages (2 Ev) is provided, but there is no limitation thereto. For example, in a case where the lens unit 100 is able to change an aperture value with resolution corresponding to 1/3 stage of exposure, the exposure difference between the settable aperture values is set to be at least 2/3 stage (2/3 Ev). That is, for the image capturing apparatus according to one or more aspects of the disclosure, an aperture value capable of actually changing is required, at least, to be discrete with respect to the specific aperture values which are settable by the lens unit 100. In other words, the image capturing apparatus according to one or more aspects of the disclosure is required, at least, to have a configuration in which resolution of the aperture value capable of actually changing is coarse with respect to the specific aperture values which are settable by the lens unit 100.

Next, at step S402, the table generation portion 209 judges whether or not the lens unit 100 is a zoom lens. In a case where a result of the judgment is YES, the procedure moves to step S403, and, in a case of NO, the procedure moves to step S404.

At step S403, the table generation portion 209 selects the aperture changing stage number so as to be suitable for a change in the maximum aperture value caused by a zooming operation of the lens unit 100. In the lens unit 100 assumed in the present embodiment, an amount of the change in the maximum aperture value from the wide-angle side to the telephoto side is one stage of exposure, so that the aperture changing stage number is temporarily set as one stage of exposure.

Next, at step S404, the table generation portion 209 reads the number of driving times of the aperture 102 until the present, add a maximum value of a predetermined value α (0≤α) which satisfies a formula (1) below to the aperture changing stage number which has been set at step S401 or 5403, and sets the aperture changing stage number. Note that, in the present embodiment, a configuration in which the predetermined value α is incremented or decremented by 1 is provided, but, for example, in a case where each pitch width between aperture values which are set in advance and specific to the lens unit 100 is 0.5 stage, a configuration in which each change in the predetermined value α is performed by 0.5 may be provided.

$$\text{The number of driving times of the aperture } 102 \geq \\ \text{(the number of durable driving times of the aperture } 102/(\alpha+1)) \times \alpha \quad (1)$$

For example, when it is assumed that the number of driving times of the aperture 102 of the lens unit 100 is 500 and the number of durable driving times of the aperture 102 is 1000, the maximum value of the predetermined value α is 1. Moreover, when it is assumed that the number of driving times of the aperture 102 of the lens unit 100 is 700 and the number of durable driving times of the aperture 102 is 1000, the maximum value of the predetermined value α is 3. Furthermore, when it is assumed that the number of driving times of the aperture 102 of the lens unit 100 is 900 and the number of durable driving times of the aperture 102 is 1000, the maximum value of the predetermined value α is 7. That is, when the predetermined value α is set so as to satisfy the aforementioned formula (1), the predetermined value α becomes larger as the number of driving times of the aperture 102 until the present becomes close to the number of durable driving times of the aperture 102, which is set in advance, so that the aperture changing stage number becomes larger. Thus, in the camera 1 of the present embodiment, it is possible to set an aperture changing stage number which reduces the number of driving times of the aperture 102 as the number of driving times of the aperture 102 increases.

Next, the setting method of the settable aperture value will be described. As illustrated in FIG. 5C, in a case where this is the first processing, at step S501, the table generation portion 209 temporarily sets the total number of settable aperture values, which serves as a reference, to be 4. In this case, four aperture values can be provided in total. Note that, the total number of settable aperture values, which is to be set after starting the processing, may be another number.

At step S502, the table generation portion 209 sets candidates of the settable aperture values in accordance with specific aperture values which are settable by the lens unit 100. For example, in the present embodiment, the specific aperture values which are settable by the lens unit 100 are aperture values of f/2.8 to f/22, so that at least aperture values of f/2.8 to f/22 are the candidates of the settable aperture values. Note that, in a case where the aperture changing stage number has been set, the total number of settable aperture values is temporarily set on the basis of the set aperture changing stage number. For example, in a case where the aperture changing stage number has been set to be two stages by the processing at step S404, four settable aperture values at the most are temporarily set in a range of the specific aperture values of f/2.8 to f/22 (of six stages in total).

Next, at step S503, the table generation portion 209 subtracts the predetermined value α, which has been acquired with the above-described formula (1), from the total number of candidate values which has been set at step S502. For example, when it is assumed that the number of driving times of the aperture 102 of the lens unit 100 is 500 and the number of durable driving times of the aperture 102 is 1000, the maximum value of the predetermined value α is 1. Thus, in a case where the total number of settable aperture values, which has been set, is 4, the total number of settable aperture values is set to be 3. Moreover, when it is assumed that the number of driving times of the aperture 102 of the lens unit 100 is 700 and the number of durable driving times of the aperture 102 is 1000, the maximum value of the predetermined value α is 3. Thus, in the case where the total number of settable aperture values, which has been set, is 4, the total number of settable aperture values is set to be 1. That is, with the processing at step S503, the total number of settable aperture values decreases as the number of driving times of the aperture 102 until the present becomes closer to the number of durable driving times of the aperture 102, which is set in advance. Accordingly, the camera 1 of the present embodiment is able to set (the total number of) settable aperture values with which the number of driving times of the aperture 102 decreases as the number of driving times of the aperture 102 increases. The table generation portion 209 generates the aperture table data on the basis of results of the above-described various types of setting processing.

As described above, the camera 1 of the present embodiment is configured to set, on the basis of lens information of the lens unit 100, information related to an aperture value to be used for exposure control. Specifically, the camera 1 of the present embodiment is configured to set, on the basis of the lens information, aperture table data including information of a target value related to control of the aperture 102, a settable aperture value, each stage difference between settable aperture values, and the like. With this configuration, the camera 1 of the present embodiment is able to set a most suitable aperture value for the exposure control on the basis of the lens information. Thus, the camera 1 according to the present embodiment is able to suppress, in accordance with various conditions except a luminance value, an increase in frequency of changing an aperture value.

Note that, although the configuration in which the aperture table data is set on the basis of information such as the identification value of the lens 101, driving information of the aperture 102, and the MTF characteristics among pieces of the lens information has been described in the present embodiment, there is no limitation thereto. For example, it is assumed that the lens unit 100 is an exchangeable lens unit. In this case, when a configuration in which, for each lens, information related to an aperture value whose frequency of use is high is included in the lens information is provided, the table generation portion 209 sets, on the basis of the information, the aperture table data so as to correspond to the aperture value whose frequency of use is high. Moreover, a configuration in which aperture table data itself as described above is transmitted to the side of the camera main body 200 from the side of the lens unit 100 as the lens information and exposure control is instructed in the side of the camera main body 200 may be provided. Note that, in any case, when aperture table data in which a shift is allowed to be performed over a plurality of aperture values is set, data with which an actual aperture value changes discretely with respect to specific aperture values which are settable by the lens unit 100 is set.

(Second Embodiment)

Figure 6:
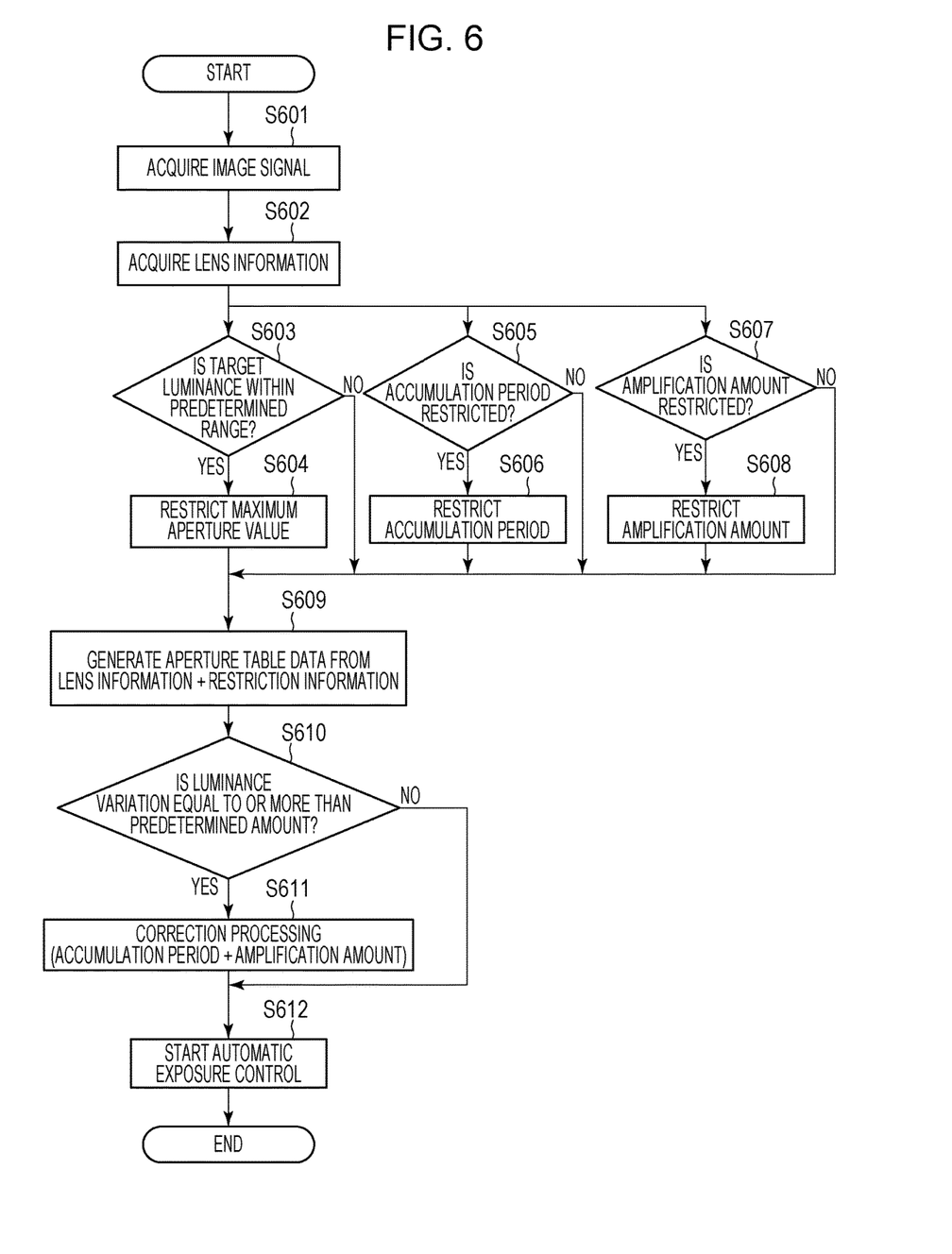
FIG. 6 is a flowchart for explaining image capturing processing according to at least a second embodiment of the disclosure.

Next, a second embodiment of the image capturing apparatus of the disclosure will be described with reference to FIG. 6. Note that, since a configuration of the monitoring camera (hereinafter, simply referred to as the camera) 1 is the same as that of the above-described first embodiment, description thereof will be omitted. The present embodiment is different from the above-described first embodiment in that, in a case where target exposure is included in a predetermined range, a maximum aperture value which is settable is restricted to the closing side. FIG. 6 is a flowchart for explaining image capturing processing according to at least the second embodiment of the disclosure. Note that, since processing at steps S601 and S602 is the same as the processing at steps S201 and S202 of the above-described first embodiment, description thereof will be omitted.

At step S603, the camera control portion 211 calculates a luminance signal (object luminance) by executing a photometric operation based on the image signal which has been acquired, and calculates target luminance, which is a target of exposure control, on the basis of the luminance signal. Then, the camera control portion 211 judges whether or not the calculated target luminance is included in the predetermined range.

Note that, a configuration in which not the target luminance but target exposure corresponding to the target luminance is calculated and whether or not the target exposure is included in a predetermined range is judged may be provided. That is, the camera control portion (first judgment unit) 211 is required only to be configured to judge whether or not information related to brightness of an object based on a photometric result of the object is included in a predetermined range. Moreover, as a method of the above-described photometric operation, any known method may be adopted. Further, in a case where the camera 1 is provided with a sensor for photometry other than the image sensor 204, a configuration in which the photometric operation is executed on the basis of an output of the sensor for photometry may be provided.

In a case where, in the processing at step S603, it is judged that the target luminance is included in the predetermined range, the camera control portion 211 restricts a maximum aperture value of the aperture 102, and stores information thereof in the memory 212 at step S604. Description will be given specifically. For example, it is assumed that the maximum aperture value specific to the lens unit 100 is f/1.4. At this time, in a case where the target luminance is included in the predetermined range, with respect to the specific maximum aperture value which is set for the lens unit 100, the maximum aperture value is restricted to f/2.8 which is closer to the closing side compared with f/1.4. That is, in the camera 1 of the present embodiment, compared with a case where it is judged that the target luminance is not included in the predetermined range, in the case where it is judged that the target luminance is included in the predetermined range, an aperture value which is actually settable is restricted so as to be closer to the closing side. With this configuration, depth of field when the maximum aperture value is set becomes deep, so that it is possible to suppress a shift of a degree of in-focus (focus) caused by a shift of the shift lens (not illustrated) of the lens 101 according to a change in temperature or the like.

Note that, although the above-described predetermined range may be any range and the maximum aperture value after the restriction may be any value, it is desired that the range is a range in which an aperture value with which the depth of field becomes comparatively shallow is set and the maximum aperture value is restricted to a value which causes less reduction in resolution of an acquired image.

In parallel with the processing at steps S603 and S604, whether or not restriction is provided to a settable accumulation period is judged at step S605. For example, in a case where a predetermined accumulation period is designated from an outside with an instruction by a user or the like, judgment as YES is made in the processing at step S605. In a case where, in the processing at step S605, it is judged that the accumulation period is restricted, information indicating that the accumulation period is restricted to the designated one is stored in the memory 212 at step S606.

Further, in parallel with the processing at steps S603 and 5604, whether or not restriction is provided to a settable amplification amount (amplification factor) of the image signal is judged at step S607. For example, in a case where a predetermined amplification factor is designated from an outside with an instruction by a user or the like, judgment as YES is made in the processing at step S607. In a case where, in the processing at step S607, it is judged that the amplification factor is restricted, information indicating that the amplification factor is restricted to the designated one is stored in the memory 212 at step S608.

Next, at step S609, the table generation portion 209 generates aperture table data on the basis of the lens information which has been acquired and the information (restriction information) related to the restriction of each exposure parameter, which is stored in the memory 212. Note that, the aperture table data generated at step S609 is the same as that of the above-described first embodiment except that an aperture value with which the restricted exposure parameter is not set is selected.

At step S610, the camera control portion 211 estimates an amount of luminance variation of a case where an aperture value is changed so as to be an aperture target value based on the generated aperture table data. Note that, in the present embodiment, a difference between a current aperture value and the aperture target value corresponds to the amount of the luminance variation described above. Then, the camera control portion (second judgment unit) 211 judges whether or not exposure corresponding to the difference is equal to or more than a predetermined amount (predetermined exposure (stage number)) to thereby judge whether or not the amount of the luminance variation is equal to or more than the predetermined one.

In a case where, in the processing at step S610, it is judged that the amount of the luminance variation is equal to or more than the predetermined one, the exposure control portion 207 executes correction processing for suppressing the luminance variation at step S611. The correction processing will be specifically described. In the present embodiment, as described above, a setting value of the parameter of at least one of the accumulation period and the amplification amount is changed by an amount corresponding to exposure at a time of changing the aperture diameter of the aperture 102 from the current aperture value to the aperture target value. For example, in a case where exposure is changed by an amount corresponding to +two stages (+2 Ev) due to the change in the aperture value, the accumulation period and/or the amplification amount are/is changed by an amount of −two stages (−2 Ev).

With this configuration, it is possible to reduce a sudden luminance change (luminance shock) according to the change in the aperture diameter of the aperture 102. Note that, in a case where the amount of the luminance variation is less than the predetermined one, it is judged that an influence of the luminance shock is small, and the correction processing is not to be executed. Since processing at step S612 is the same as the processing at step S204 of the above-described first embodiment, description thereof will be omitted. The above is the image capturing processing of the present embodiment.

As described above, the camera 1 of the present embodiment is configured to generate aperture table data on the basis of information related to luminance of an object in addition to lens information of the lens unit 100. With this configuration, the camera 1 according to the present embodiment is able to not only set an aperture value whose frequency of changing is low but also to suppress acquisition of an unnatural image due to an influence of focus or the like.

Moreover, the camera 1 of the present embodiment is configured to estimate luminance variation according to a change in an aperture value, and to execute correction processing using an exposure parameter other than that of the aperture value in accordance with the estimated luminance variation. With this configuration, it is possible not only to set an aperture value whose frequency of changing is low but also to reduce an influence of luminance shock according to a change in the aperture diameter of the aperture 102.

(Third Embodiment)

Figure 7:
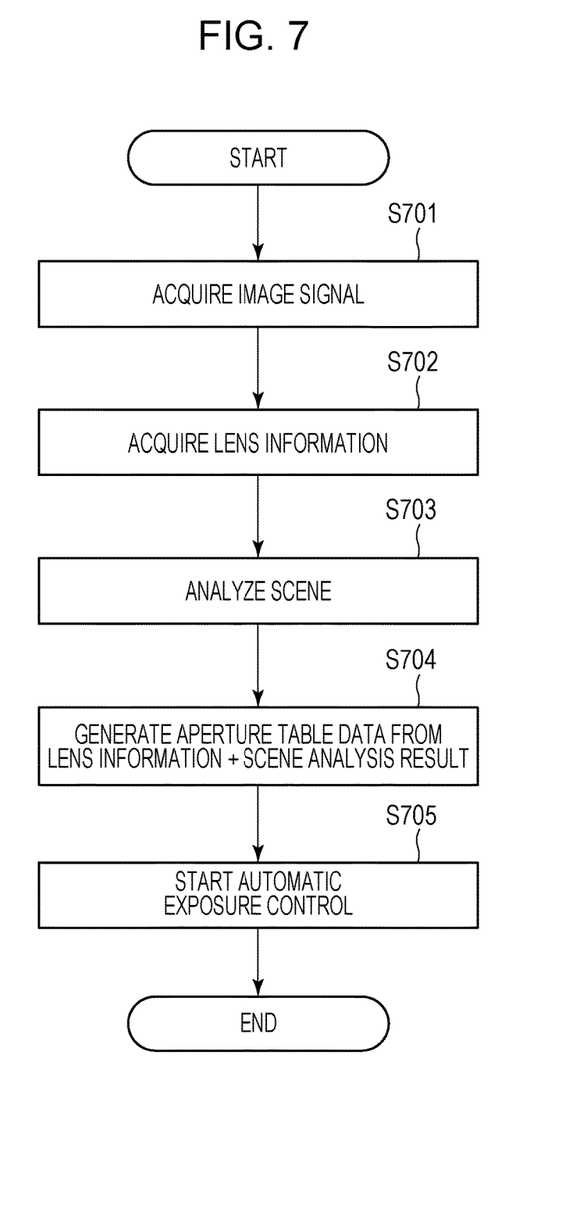
FIG. 7 is a flowchart for explaining image capturing processing according to at least a third embodiment of the disclosure.

Next, a third embodiment of the image capturing apparatus of the disclosure will be described with reference to FIG. 7. Note that, since a configuration of the monitoring camera (hereinafter, simply referred to as the camera) 1 is the same as that of the above-described first embodiment, description thereof will be omitted. The present embodiment is different from the above-described first embodiment in that aperture table data is generated on the basis of a photographing scene. FIG. 7 is a flowchart for explaining image capturing processing according to at least the third embodiment of the disclosure. Note that, since processing at steps S701 and 5702 is the same as the processing at steps S201 and S202 of the above-described first embodiment, description thereof will be omitted.

At step S703, on the basis of the image signal which has been acquired, the camera control portion (scene judgment unit) 211 judges a scene at a time of capturing an image of an object. Note that, information to be used for the judgment of the scene (scene analysis) is information including, for example, luminance information related to object luminance, color information, a range (proper exposure range) in which proper exposure is performed, a count of a specific object based on a detection result of the specific object (for example, a face, a person, or the like), etc.

Here, a configuration may be provided such that the luminance information and the color information are acquired by the image processing portion 210 or the camera control portion 211 on the basis of an RGB signal of the image signal, or a configuration in which the RGB signal is converted into a YUV signal (color luminance information) and the acquisition is performed on the basis of the YUV signal may be provided, for example. Then, on the basis of the acquired color information, the image processing portion 210 or the camera control portion 211 judges whether the photographing scene is an inside of a building (with indoor light) or an outside of a building (with sunlight).

As a detecting method and a counting method of a specific object, any known method may be adopted. For example, the camera control portion 211 compares contour information of a person which is stored in the memory 212 in advance and edge information in the acquired image signal, and detects, as a face or a person, an object similarity of contour of which is equal to or more than a predetermined threshold. Then, the camera control portion 211 counts the number of detected specific objects in a predetermined period.

Figure 8:
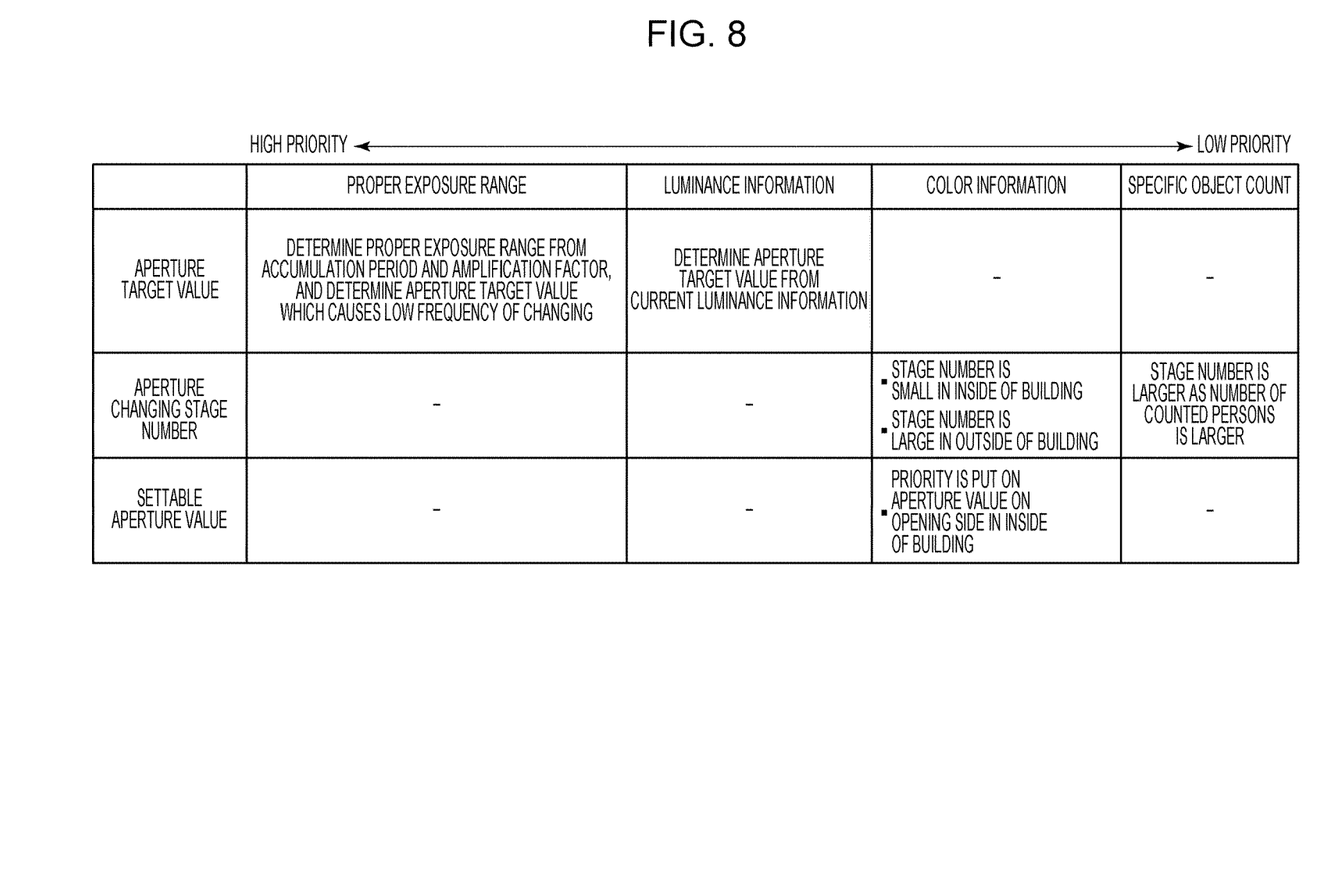
FIG. 8 is a table for exemplifying a setting method of aperture table data according to at least the third embodiment of the disclosure.
Figure 9:
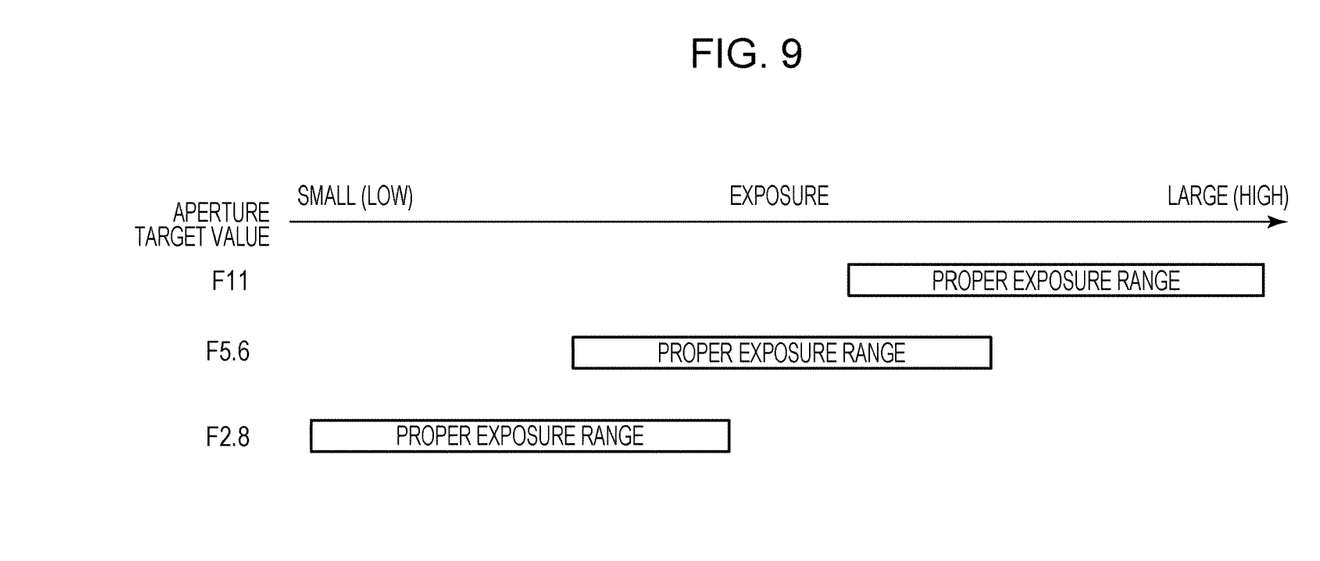
FIG. 9 is a view for exemplifying a proper exposure range according to at least the third embodiment of the disclosure.

Next, at step S704, the table generation portion 209 generates aperture table data on the basis of the acquired lens information and a judgment result of the scene judgment. Hereinafter, details thereof will be specifically described with reference to FIG. 8 and FIG. 9. FIG. 8 is a table for exemplifying a setting method of the aperture table data according to at least the third embodiment of the disclosure. FIG. 9 is a view for exemplifying a proper exposure range according to at least the third embodiment of the disclosure.

As illustrated in FIG. 8, a configuration in which a proper exposure range, luminance information, color information, and a count of a specific object are adopted as the scene judgment result with which the aperture table data is set is provided in the present embodiment. Note that, although not being illustrated in FIG. 8, the lens information in the first embodiment as illustrated in FIG. 4 is added for generation of the aperture table data. In the present embodiment, a configuration in which the aperture table data is generated on the basis of both of the lens information and the scene judgment result is provided, but a configuration in which the aperture table data is generated on the basis of only the scene judgment result may be provided.

For example, in order to set an aperture target value, the proper exposure range is referred to first. The proper exposure range is set on the basis of an accumulation period related to the image sensor 204 and a settable range of an amplification amount of the image signal. That is, the proper exposure range means a range related to exposure, in which exposure tracking (exposure control) according to a luminance change of an object is able to be performed without changing an aperture value. When variation of object luminance is included in the proper exposure range, it is possible to suppress frequency of changing an aperture value.

As illustrated in FIG. 9, the proper exposure range in which exposure tracking is able to be performed by changing only the accumulation period and the amplification amount varies in accordance with an aperture value. Accordingly, the table generation portion 209 selects, as candidates of an aperture target value, a plurality of aperture values each of which is considered to have low frequency of changing in a calculated proper exposure range. Then, on the basis of the acquired luminance information, among the candidates of an aperture target value which have been selected, the table generation portion 209 sets a value suitable for current brightness as the aperture target value.

Next, the table generation portion 209 makes the aperture changing stage number comparatively small in a case where the photographing scene which has been judged is an inside of a building, and makes the aperture changing stage number comparatively large in a case where the photographing scene is an outside of a building. This is because, in a case of photographing in an inside of a building, a degree of a luminance change caused by a time lapse or an external factor is low, and it is therefore considered that the frequency of changing an aperture value is low even when the aperture changing stage number is small.

The table generation portion 209 makes the aperture changing stage number larger as the number of counted persons is larger. This is because, in a scene in which a plurality of persons are detected in a predetermined period, there is a high possibility that a most suitable exposure condition changes in proportion to the number of persons, and a possibility that frequency of changing an aperture value increases correspondingly thereto becomes high.

In a case where the photographing scene which has been judged is an inside of a building, the table generation portion 209 considers that there is a low possibility that a plurality of objects whose object distances are different are included in an angle of view, and preferentially sets an aperture value on the opening side, which enables high resolution and with which a depth of field is shallow, as a settable aperture value.

Note that, although not being illustrated in FIG. 8, a configuration in which the table generation portion 209 refers to statistical information related to a luminance change, which is stored in the memory 212, to thereby estimate an aperture value whose frequency of use is the highest and set an aperture target value on the basis of a result of the estimation may be provided. The above-described statistical information is information based on object luminance (most frequent luminance) whose frequency of having been detected in the past by the camera 1 is the highest or maximum luminance and minimum luminance. By adopting this configuration, it is possible to estimate a luminance change of an object to thereby set, as the aperture target value, an aperture value whose frequency of changing is considered to be the lowest, thus making it possible to further suppress the frequency of changing an aperture value.

Description is returned to FIG. 7. Since processing at step S705 is approximately the same as the processing at step S204 of the above-described first embodiment, description thereof will be omitted. The above is the image capturing processing according to the present embodiment. Note that, although judgment as to an inside of a building and an outside of a building has been mentioned for the above-described scene judgment, a configuration for other judgment of a photographing scene, for example, as to whether to photograph a distant view of a photographing scene or to photograph a close view of a photographing scene may be provided. Moreover, although the configuration in which aperture table data is generated on the basis of a scene for which the camera 1 performs judgment (analysis) on the basis of the acquired various types of information has been described in the present embodiment, there is no limitation thereto. For example, a configuration in which aperture table data is generated on the basis of a scene according to information of a photographing mode or the like, which is set by a user, may be provided.

As described above, the camera 1 according to the present embodiment is configured to generate aperture table data on the basis of a scene at a time of photographing an object. With this configuration, the camera 1 of the present embodiment is able to control, in accordance with each scene, the aperture 102 with an aperture value, whose frequency of changing is assumed to be low, as a reference, so that it is possible to suppress an increase in frequency of changing an aperture value.

As above, the embodiments and modified examples of the disclosure have been described, but the disclosure is not limited thereto, and various modification and changes are possible within a scope of the gist thereof. For example, in the above-described embodiments, the aperture changing stage number in the same aperture table data always has a constant stage difference (difference) between continuous settable aperture values, but a configuration in which the stage difference is variable may be provided. For example, as in aperture table data in which settable aperture values are f/2.8, f/5.6, and f/16, the aperture changing stage number may be two stages of exposure between f/2.8 and f/5.6, and may be three stages of exposure between f/5.6 and f/16. Note that, even in the above-described case, the camera 1 requires only that the aperture changing stage number is discrete with respect to an exposure stage difference between specific aperture values which are settable by the lens unit 100. In other words, what is required is only a configuration in which an exposure stage difference between continuous settable aperture values in aperture table data is greater than the exposure stage difference between continuous specific aperture values which are settable by the lens unit 100.

Moreover, in the above-described embodiments, description has been given for the case where the lens unit 100 is a photographing lens which is attachable (detachable) with respect to the camera main body 200, but there is no limitation thereto. For example, without limitation to the case of being mechanically attached to the camera main body 200, the lens unit 100 is required only to be configured so as to be able to perform communication with the camera main body 200 and so that control of an operation of the aperture 102 of the lens unit 100 is allowed to be performed from the side of the camera main body 200. That is, the lens unit 100 is required only to be configured to be connected with the camera main body 200.

Further, the camera 1 may be a so-called lens-integrated camera in which the lens unit 100 and the camera main body 200 are integrally formed. In this case, information related to the aperture 102 is stored in the memory 212 in advance.

Moreover, although the configuration in which the exposure control portion 207, the lens information acquisition portion 208, the table generation portion 209, the image processing portion 210, the camera control portion 211, and the like operate together to thereby control various operations of the camera 1 is provided in the above-described embodiments, there is no limitation thereto. For example, a configuration in which a program according to the flow illustrated in FIG. 2, FIGS. 5A to 5C, FIG. 6, or FIG. 7 described above, or the like is stored in the memory 212 in advance and the camera control portion 211 or the like executes the program to thereby control the various operations of the camera 1 may be provided.

In addition, as long as having a function of the program, any form of the program such as an object code, a program executed by an interpreter, or script data supplied to an OS may be used. As a recording medium for supplying the program, a hard disk, a magnetic recording medium such as a magnetic tape, or optical/magneto-optical recording medium may be used, for example.

Further, although the monitoring camera 1 has been described in the above-described embodiments as an example of the image capturing apparatus that carries out one or more aspects of the disclosure, there is no limitation thereto. For example, a configuration in which an image capturing apparatus other than the monitoring camera, that is, a portable device such as a digital camera, a digital video camera, or a smartphone, a wearable terminal, or the like is adopted may be provided.

(Other Embodiments)

At least one embodiment of the disclosure is also able to be realized by processing in which a program that realizes one or more functions of the above-described embodiments is supplied to a system or an apparatus via a network or a storage medium and one or more processors in a computer of the system or the apparatus reads and executes the program. Moreover, at least a further embodiment of the disclosure is also able to be realized by a circuit (for example, an ASIC) which realizes one or more functions.

(Other Embodiments)

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-148939 filed Jul. 28, 2016, which is hereby incorporated by reference herein in its entirety.

What is claimed is:

1. An image capturing apparatus capable of changing an aperture value related to a change in an aperture diameter of an aperture, comprising:
   an image sensor; and
   one or more processors and one or more storage media configured to function as
      an exposure control unit configured to execute exposure control by changing at least an aperture value; and
      a generation unit configured to generate aperture control information related to the change in the aperture value in the exposure control,
   wherein in a case where the exposure control is executed by changing the aperture value in accordance with a luminance change of an object,
      the generation unit generates the aperture control information so that, with respect to specific aperture values that are settable in the image capturing apparatus, an actual aperture value discretely changes, and, on a basis of the aperture control information generated by the generation unit, the exposure control unit discretely changes the actual aperture value with respect to the specific aperture values that are settable, wherein a number of actual aperture values, which include the actual aperture value and which are discretely changed, is less than a number of the specific aperture values that are settable in the image capturing apparatus, and wherein the actual aperture values, which are discretely changed, are included in the specific aperture values.

2. The image capturing apparatus according to claim 1, wherein the generation unit generates, as the aperture control information, an aperture value that serves as a target at a time of starting the exposure control, an aperture value that is actually settable, and information related to a difference between aperture values, which are capable of actually changing, so that the actual aperture value discretely changes with respect to the specific aperture values which are settable.

3. The image capturing apparatus according to claim 1, wherein the one or more processors and the one or more storage media are further configured to function as a first judgment unit configured to judge whether or not a brightness of an object based on a photometric result of the object is included in a predetermined range, wherein the generation unit generates the aperture control information so that a restriction value of the aperture value on an opening side, in a case where the first judgment unit judges that the brightness of the object is included in the predetermined range, is closer to a closing side than a restriction value of the aperture value on the opening side, in a case where the first judgment unit judges that the brightness of the object is not included in the predetermined range.

4. The image capturing apparatus according to claim 3, wherein the one or more processors and the one or more storage media are further configured to function as a second judgment unit configured to judge whether or not an amount of luminance variation according to a change in the aperture diameter of the aperture based on the aperture control information that is generated by the generation unit is equal to or more than a predetermined amount, wherein the exposure control unit changes an accumulation period and an amplification amount correspondingly to the amount of the luminance variation, in a case where the second judgment unit judges that the amount of the luminance variation is equal to or more than the predetermined amount.

5. The image capturing apparatus according to claim 1, wherein the generation unit generates the aperture control information on a basis of lens information related to a lens unit that is provided with the aperture.

6. The image capturing apparatus according to claim 5, wherein the lens information includes information related to at least one of an identification value of the lens unit, an upper limit value and a lower limit value of the specific aperture values which are settable, a focal length of the lens unit, a shift amount of shifting of a lens included in the lens unit due to a change in temperature, Modulation Transfer Function (MTF) characteristics, and a number of times of changing the aperture value in a predetermined period.

7. The image capturing apparatus according to claim 5, wherein the lens information includes information related to whether or not the lens unit is a zoom lens, and the generation unit generates the aperture control information so that an aperture value that is actually settable is restricted more in a case where the lens unit is a zoom lens compared with a case where the lens unit is not a zoom lens.

8. The image capturing apparatus according to claim 5, wherein the generation unit generates the aperture control information so that an aperture value that is actually settable is restricted to being closer to a closing side in a case where the lens unit is a zoom lens compared with a case where the lens unit is not a zoom lens.

9. The image capturing apparatus according to claim 1, wherein the generation unit generates the aperture control information on a basis of information related to a scene at a time of capturing an image of an object.

10. The image capturing apparatus according to claim 9, wherein the one or more processors and the one or more storage media are further configured to function as a scene judgment unit configured to judge, on a basis of the information related to a scene, a scene at a time of capturing an image of an object, wherein the generation unit generates the aperture control information on a basis of a judgment result of the scene judgment unit.

11. The image capturing apparatus according to claim 9, wherein the information related to a scene includes at least one of luminance information of an object, color information, an exposure range in which tracking of exposure according to a luminance change of the object is possible by changing a parameter other than that of an aperture value, and information related to a number of counted specific objects in a predetermined period.

12. The image capturing apparatus according to claim 11, wherein the exposure range is a range related to exposure that exposure control is executed by, in accordance with the luminance change of the object, suppressing frequency of changing an aperture value and preferentially changing an accumulation period and an amplification amount.

13. A controlling method of an image capturing apparatus that includes an image sensor and is capable of changing an aperture value related to a change in an aperture diameter of an aperture, comprising:

exposure controlling for executing exposure control by changing at least an aperture value; and generating for generating aperture control information related to the change of the aperture value in the exposure control, wherein in a case where the exposure control is executed by changing an aperture value in accordance with a luminance change of an object, at the generating, the aperture control information is generated so that, with respect to specific aperture values that are settable in the image capturing apparatus, an actual aperture value discretely changes, and at the exposure controlling, on a basis of the aperture control information generated at the generating, the actual aperture value is discretely changed with respect to the specific aperture values that are settable, wherein a number of actual aperture values, which include the actual aperture value and which are discretely changed, is less than number of the specific aperture values that are settable in the image capturing apparatus, and wherein the actual aperture values, which are discretely changed, are included in the specific aperture values.

14. A non-transitory computer-readable medium storing therein a program that causes a computer to execute a controlling method of an image capturing apparatus that includes an image sensor and is capable of changing an aperture value related to a change in an aperture diameter of an aperture, the controlling method comprising:

exposure controlling for executing exposure control by changing at least an aperture value; and generating for generating aperture control information related to the change of the aperture value in the exposure control, wherein in a case where the exposure control is executed by changing the aperture value in accordance with a luminance change of an object, at the generating, the aperture control information is generated so that, with respect to specific aperture values that are settable in the image capturing apparatus, an actual aperture value discretely changes, and at the exposure controlling, on a basis of the aperture control information generated at the generating, the actual aperture value is discretely changed with respect to the specific aperture values that are settable, wherein a number of actual aperture values, which include the actual aperture value and which are discretely changed, is less than a number of the specific aperture values that are settable in the image capturing apparatus, and wherein the actual aperture values, which are discretely changed, are included in the specific aperture values.

15. An image capturing apparatus capable of changing an aperture value related to a change in an aperture diameter of an aperture, comprising:

an image sensor; and one or more processors and one or more storage media, wherein the one or more processors and the one or more storage media are configured to operate together to cause the image capturing apparatus to perform exposure control by changing an aperture value in accordance with a luminance change of an object;

generate aperture control information based on the change in the aperture value, wherein the aperture control information identifies discrete candidate aperture values among specific aperture values that are settable in the image capturing apparatus, wherein a number of the candidate aperture values is less than a number of the specific aperture values, and wherein the specific aperture values include the candidate aperture values; and set an aperture value of an aperture to one candidate aperture value of the discrete candidate aperture values.

* * * * *